United States Patent [19]

Loest

[11] 4,031,182

[45] June 21, 1977

[54] RECOVERY OF ALUMINUM FROM ALUNITE ORE USING ACID LEACH TO PURIFY THE RESIDUE FOR BAYER LEACH

[75] Inventor: Kent W. Loest, Broomfield, Colo.

[73] Assignees: Southwire Company, Carrollton, Ga.; National Steel Corporation, Pittsburgh, Pa.; Earth Sciences, Inc., Golden, Colo.; part interest to each

[22] Filed: Mar. 24, 1976

[21] Appl. No.: 669,621

[52] U.S. Cl. ............................... 423/127; 423/132; 423/120; 423/131; 423/122; 423/128; 423/123

[51] Int. Cl.[2] ...................... C01F 7/06; C01F 7/14

[58] Field of Search .......... 423/111, 120, 122, 127, 423/131, 132, 128

[56] References Cited

UNITED STATES PATENTS

| | | | |
|---|---|---|---|
| 1,256,605 | 2/1918 | Spence et al. | 423/120 |
| 1,948,887 | 2/1934 | Sanders | 423/127 |
| 1,951,443 | 3/1934 | Sanders | 423/127 |
| 2,120,840 | 6/1938 | McCullough | 423/120 |
| 2,398,425 | 4/1946 | Haff | 423/120 |
| 3,436,176 | 4/1969 | Spedden et al. | 423/127 |

Primary Examiner—Herbert T. Carter
Attorney, Agent, or Firm—Van C. Wilks; Herbert M. Hanegan; Stanley L. Tate

[57] ABSTRACT

A process for recovering aluminum from alunite ore directed to providing a residue for the Bayer leach step substantially free of impurities so that a high A/C ratio Bayer leach liquor is produced, which comprises roasting the ore in particulate form to drive off water and sulfur as $SO_2$ and to convert aluminum sulfate to alumina, leaching the residue containing aluminum values with water and filtering to remove potassium sulfate and other soluble sulfates, hot leaching the residue with sulfuric acid to convert the alumina therein to soluble aluminum sulfate followed by filtering to remove silicon dioxide and other solid impurities, crystallizing the aluminum sulfate to further remove impurities, heating the residue to convert the aluminum sulfate to alumina and drive off any remaining sulfur as $SO_2$, and digesting the alumina calcine with sodium hydroxide under standard Bayer conditions at a high A/C ratio to provide a high A/C ratio solution from which a "sandy" aluminum hydroxide is precipitated.

7 Claims, 1 Drawing Figure

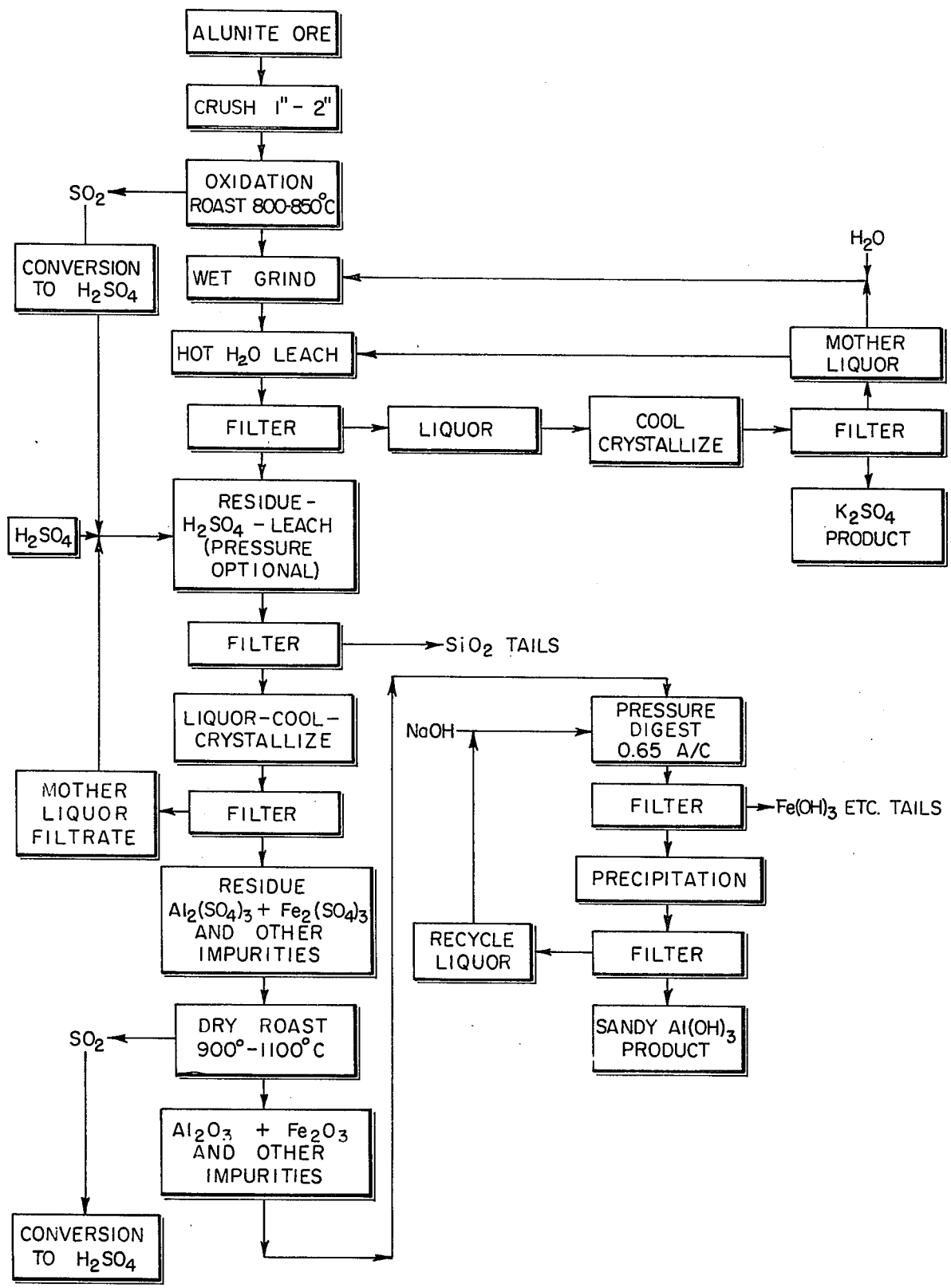

RECOVERY OF ALUMINUM FROM ALUNITE ORE USING ACID LEACH TO PURIFY THE RESIDUE FOR BAYER LEACH

BACKGROUND OF THE INVENTION

1. Field of the Invention

The invention lies in the field of recovery of aluminum from alunite.

2. Description of the Prior Art

In prior art processes for the recovery of aluminum from alunite ore, it is conventional to prepare a residue containing aluminum valves for a Bayer digestion step by dehydrating the ore and removing sulfur from it. In this procedure, it is necessary to grind the ore to about −20m for fluid bed reactors in which the particulate ore is roasted to remove water and some of the sulfur from the aluminum sulfate as sulfur dioxide. Potassium hydroxide is conventionally added to convert the remaining sulfate to soluble potassium sulfate in which form it is removed. The roasting converts the aluminum sulfate to aluminum oxide for the Bayer leach which converts it to soluble aluminates from which aluminum values are recovered as aluminum hydroxide.

Although the prior art processes as outlined above are commerically feasible, they are subject to improvements which will enhance their commerical possibilities.

One disadvantage is the fact that the fluid bed reactors which must be used for dehydration and desulfurization of the ore are very large and involve high capital costs. The ore must ground to −20m for use in the fluid bed reactors, and this involves large capital and operating costs in dry grinding. Large operating costs are involved in the potassium hydroxide addition which must be added in amounts of 20–50 pounds per ton or ore and addition in these amounts produces large amounts of by-product potassium sulfate that is difficult to dispose of profitably. Further, large capital costs are involved in operating the Bayer leach circuits required to achieve "sandy" alumina from the low A/C (aluminum to caustic) ratio liquors resulting from prior art procedures. Further, prior art procedures result in a large mud load for a Bayer plant and the sulfate contamination of the Bayer liquor resulting from ineffective removal of sulfate in the preparatory procedure contributes to large operating costs. Additionally, prior art procedures require a separate desilication section to remove the large amounts of silica carried over in the Bayer leach liquor before aluminum hydroxide can be precipitated from it.

Accordingly, it would be advantageous to have available a process for recovering aluminum from alunite in which in the preparation of the ore for the Bayer leach, fine grinding is not required, sulfate is effectively removed without the use of potassium hydroxide, the mud load on the Bayer plant is reduced, a Bayer leach liquor is produced having a high A/C content, and silicon dioxide is removed from the ore residue prior to the Bayer leach so that a separate desilication section is not necessary for removing silicon compounds from the Bayer leach liquor before aluminum hydroxide can be precipitated from it.

SUMMARY OF THE INVENTION

The ore is crushed to about ½ inch pieces followed by oxidation roast to remove sulfur as sulfur dioxide and convert aluminum sulfate to aluminum oxide. The calcined residue is then leached with water to remove soluble potassium sulfate. The residue is then leached with hot sulfuric acid to convert the alumina back to soluble aluminum sulfate with the effective removal of insoluble silicon dioxide. After the separation of the silicon dioxide from the hot aluminum sulfate filtrate, the latter is crystallized to remove impurities and the crystals roasted to reconvert the sulfate to alumina substantially free of silicon dioxide and other impurities. The calcined alumina residue is subjected to the Bayer leach with the production of a Bayer liquor of a high A/C content due to the freedom of the calcine from impurities. A sandy aluminum hydroxide product can then be precipitated from the high A/C Bayer leach liquor and alumina recovered from the product by calcining.

BRIEF DESCRIPTION OF THE DRAWING

The single drawing is a flow sheet of the process of the invention.

DESCRIPTION OF THE PREFERRED EMBODIMENTS

The operation of the invention will be discussed with reference to the accompanying flow sheet drawing.

The raw alunite ore is ground to a particle size of about ½ to 1 inch. It is an advantage of this invention that this large particle size can be used in contrast to the prior art in which a particle size no larger than about −20 mesh was feasible. Grinding can be accomplished in a conventional cone or jaw crusher. By using this large particle size, dust losses are minimal and scrubbing cyclones are unnecessary.

The next step is the oxidation roast of the ore to remove water and sulfur. A fluid bed is not necessary for this roasting, which can be accomplished in a direct fired rotary kiln. The ore is roasted at a temperature of about 800°–850° C for a period of about 0.5–2 hours. The temperature control need not be closely regulated, but the temperature should be within ± 30° C of the above range. Aluminum in the raw ore as aluminum sulfate, $Al_2(SO_4)_3$, is converted to alumina, sulfur being driven off as $SO_2$. The sulfur dioxide given off is converted to sulfuric acid which is used for subsequent leaching as shown in the flow diagram.

The roasting step does not remove all of the sulfur in the alunite, as some still remains in the calcined ore as potassium sulfate. Most of it is removed with a water leach. The calcined alunite has a much lower bond work index (about 8 as compared to ≈12 for raw ore) than raw alunite and is easily wet ground in a rod or a ball mill. The water leaching of the potassium sulfate may be begun during the wet grinding operation. After the alunite has been ground to less then about −14 mesh, water leaching of potassium sulfate is continued at 90° C in an agitated tank. As shown in the flow sheet, the liquor from the potassium sulfate leach goes to a standard potassium sulfate crystallization circuit, which gives a potassium sulfate product and a mother liquor which latter is recycled to grinding and leaching. After crystallization, the potassium sulfate can be sold. In this procedure the addition of potassium hydroxide to convert sulfate to potassium sulfate is avoided as very high sulfate extraction is not necessary.

The filtered and washed mud from the water leach containing the aluminum values as alumnia is autoclave leached at 120°–180° C. pressure optional) with 10–35 percent sulfuric acid to convert the alumina back to soluble aluminum sulfate which is dissolved along with iron and some other soluble metal impurities. The purpose of this reconversion of the aluminum values to a soluble from is to promote separations of aluminum values from other insoluble materials, mainly $SiO_2$. Soluble impurities, such as iron sulfate, will, of course, be dissolved along with the aluminum sulfate; however, a large amount of inssoluble impurities, particularly $SiO_2$, are removed by filtration. The saturated liquor is cooled and aluminum sulfate crystallized out, with removal of more impurities. Certain impurities will be carried with it, such as, iron sulfate. The aluminum sulfate is now reconverted to aluminum oxide by calcining with removal of sulfur to provide a substantially impurity-free feed for the Bayer circuit. The conversion is accomplished by feeding the aluminum sulfate crystals directly into a 900°–1100° C fluid bed reactor. The sulfur in the aluminum sulfate is driven off as sulfur dioxide which is converted to sulfuric acid in a standard plant. The calcine remaining consists of alumina, iron oxide and other impurities, and less than .1% sulfur.

The calcined alumina is digested with sodium hydroxide, or other alkali metal hydroxide, under pressure (180°) Bayer conditions at a 0.65 A/C ratio. Impurities, such as ferric hydroxide, are removed by filtration. Aluminum hydroxide product is precipitated from the filtered liquor from the Bayer circuit and due to the high A/C ratio, a sandy product is produced. It is to be noted that the special circuits ordinarily required for producing a sandy aluminum hydroxide product from a low A/C ratio liquor are avoided. Further, since substantially all of the $SiO_2$ was removed in the sulfuric acid leach step, the procedure of eliminating this compound from the Bayer leach liquor prior to precipitation of the aluminum hydroxide is avoided. The conversion of the alumina from the dehydration step to aluminum sulfate which is later crystallized and is later reconverted to alumina ensures that substantially all of the potassium sulfate is removed from the residue which goes to the Bayer leach.

The invention is illustrated by the following example, which is not limiting thereof.

EXAMPLE 1

A sample of raw alunite ore was crushed to an average size of approximately −14 mesh and oxidation roasted at 800° C for 30 minutes with the introduction of one liter of air per minute. The calcined residue of dehydrated and partially desulfurized alunite ore was water leached with fresh water at 90° C and 50% solids content for 30 minutes with the following results:

| Descrip- | Head | | | Tail | | | % Ext | | |
|---|---|---|---|---|---|---|---|---|---|
| tion | K | S | Al | K | S | Al | K | S | Al |
| 800° C calcined residue | 4.92 | 3.34 | — | 0.51 | 0.93 | 12.6 | 91 | 76 | — |

A sulfuric acid pressure leach was run on the residue from the water leach at 20% solids content, 140° C, 25% $H_2SO_4$, for a time of 30 minutes, with the following results:

| Description | Head-Al | Tail-Al | % Ext. Al as $Al_2(SO_4)_3$ |
|---|---|---|---|
| Residue from $H_2O$ Leach | 12.6 | 1.08 | 94 |

A high temperature (1150° C) roast was made on the $Al_2(SO_4)_3$ crystal from the $H_2SO_4$ leach in a lab muffle furnace using air purge at ≈1 L/minute. The resulting calcined alumina had a sulfur level of 0.07% and substantially no $SiO_2$ content. It was otherwise substantially free of impurities.

A Bayer pressure digest was made on the calcined $Al_2O_3$ product of the 1150° C roast urging 15 grams $Al_2O_3$, 100 mls. of 190 g/L NaOH at 170° C for 10 minutes. The digest yielded a clear solution containing no undissolved $Al_2O_3$ having an A/C ratio of .06. Salable aluminum is recovered as alumina from the solution.

From the above results, it can be seen that the process of the invention has a number of advantages. First of all, a large ore mesh size can be used in contrast with a −20 mesh size required for the fluid bed reactors used in the dehydration and oxidation roast of prior art processes. The water leach is effective in removing 76% of the sulfur present in the dehydrated residue containing the aluminum values without the use of potassium hydroxide. Sulfur extractions of >90% are normally required during the water leaching step when the next step is a Bayer leach, The sulfuric acid pressure leach step solubilized 94% of the aluminum in the residue from the water leach, thus eliminating $SiO_2$ and other insoluble solid impurities. The crystallization of aluminum sulfate removed further impurities. The proceding procedure and the high temperature roast for converting the aluminum values in the aluminum sulfate solution back to alumina resulted in a calcined product having a sulfur level of only 0.07%, indicating that the procedure up to this point has removed substantially all of the sulfur originally present. Further, the steps of the process eliminated substantially all of the silicon dioxide from the calcined alumina going to the Bayer circuit. This eliminates the prior art special step required to remove silicon dixode from the Bayer leach liquor prior to the precipitation of aluminum hydroxide thereform. As a result of the removal of the impurities, including $SiO_2$, sulfur and others, and the otherwise effectiveness in removing impurities in the steps preceding the Bayer leach, a high A/C ratio of 0.6 was obtained for the leach liquor resulting from the Bayer leach. A sandy aluminum hydroxide could be readily precipitated from this Bayer leach liquor with the high A/C ratio, thus eliminating the special circuits required for prior art processes in precipitating a sandy aluminum hydroxide from low A/C ratio Bayer liquor characteristic of the prior art.

1. A process for recovering aluminum hydroxide from alunite ore which comprises:
   a. grinding the ore to particulate form;
   b. oxidation roasting the particulate ore to remove water and sulfur and convert the aluminum values to alumina;
   c. grinding the calcined ore;
   d. leaching the roasted and ground ore with water to remove compounds of sulfur and alkali metal including potassium sulfate resulting in a residue containing aluminum values and silicates, and a solution containing soluble sulfates including $K_2SO_4$;
   e. separating the residue and solution of step (d);
   f. leaching said residue of step (d) with a 10 to 35 percent solution of sulfuric acid to convert the aluminum values therein to soluble aluminum sulfate, and leaving a residue containing $SiO_2$, said leaching process to be carried out at a temperature between about 120 and 180° C.

g. separating the residue of step (f) from the solution of step (f);

h. crystallizing aluminum sulfate from the solution of step (f);

i. calcining the aluminum sulfate of step (h) to drive off sulfur dioxide and convert the aluminum sulfate to aluminum oxide;

j. digesting the calcined alumina of step (i) with caustic to convert the aluminum values therein to soluble aluminates;

k. filtering the liquid of step (j) to remove insoluble impurities;

l. precipitating aluminum hydroxide from the filtered liquid of step (k).

2. The process of claim 1 in which the ore is crushed to a size no less than ½ inch.

3. The process of claim 1 in which the oxidation roast of step (b) is performed at a temperature between about 800°–850° C.

4. The process of claim 1 in which the leaching step of (d) is begun during the wet grinding of step (c).

5. The process of claim 1 in which the sulfuric acid leach of step (f) is accompanied by pressure.

6. The process of claim 1 in which the sulfur dioxide given off is converted to sulfuric acid and some of the latter recycled to step (f).

7. The process of claim 1 in which potassium sulfate recovered in step (d) is recovered by crystallization and the resulting mother liquor returned to the water leach of step (d).

* * * * *